United States Patent
Dillen

(10) Patent No.: US 6,198,801 B1
(45) Date of Patent: Mar. 6, 2001

(54) X-RAY EXAMINATION APPARATUS INCLUDING EXPOSURE CONTROL

(75) Inventor: Bartholomeus G. M. H. Dillen, Eindhoven (NL)

(73) Assignee: U.S. Philips Corporation, New York, NY (US)

(*) Notice: Subject to any disclaimer, the term of this patent is extended or adjusted under 35 U.S.C. 154(b) by 0 days.

(21) Appl. No.: 09/252,694

(22) Filed: Feb. 18, 1999

(30) Foreign Application Priority Data

Feb. 23, 1998 (EP) .................................................. 98200564

(51) Int. Cl.$^7$ ...................................................... H05G 1/64
(52) U.S. Cl. ........................................ 378/98.7; 378/98.8
(58) Field of Search ................................. 378/98.7, 98.8, 378/62; 250/201.1

(56) References Cited

U.S. PATENT DOCUMENTS

| | | | |
|---|---|---|---|
| 4,338,514 | * | 7/1982 | Bixby .................................. 250/201.1 |
| 5,574,764 | * | 11/1996 | Granfors ............................. 378/98.7 |
| 6,047,042 | * | 4/2000 | Khutoryansky et al. .............. 378/62 |
| 6,047,043 | * | 4/2000 | Kamps ................................. 378/98.7 |
| 6,069,935 | * | 5/2000 | Schick et al. ....................... 378/98.8 |
| 6,084,940 | * | 7/2000 | Van Asten .......................... 378/98.7 |

FOREIGN PATENT DOCUMENTS

| | | |
|---|---|---|
| 4406677 C2 | 9/1995 | (DE) . |
| 0629105 A1 | 12/1994 | (EP) . |
| WO 9903265 | 1/1999 | (WO) .............................. H04N/5/32 |

* cited by examiner

*Primary Examiner*—David P. Porta
*Assistant Examiner*—Pamela R. Hobden
(74) *Attorney, Agent, or Firm*—John F. Vodopia

(57) ABSTRACT

An X-ray examination apparatus comprises an X-ray detector 1 for deriving an image signal and a measurement signal from an X-ray image. The X-ray examination apparatus also includes an exposure control 2 for adjusting the X-ray examination apparatus on the basis of the measurement signal. The X-ray detector is arranged in such a manner that the measurement signal relates mainly to relevant image information in the X-ray image. The X-ray detector is notably provided with a conversion unit 22 for deriving an optical image from the X-ray image. An image sensor with an image pick-up section derives electrical charges from the optical image. The image pick-up section notably derives a measurement component from the electrical charges wherefrom the measurement signal is derived and the image pick-up section also derives an image component from the electrical charges wherefrom the image signal is derived.

15 Claims, 2 Drawing Sheets

X-RAY EXAMINATION APPARATUS INCLUDING EXPOSURE CONTROL

BACKGROUND OF THE INVENTION

1. Field of the Invention

The invention relates to an X-ray examination apparatus which is provided with an X-ray detector which includes an image sensor arranged to derive an image signal and a measurement signal from the X-ray image, and also provided with an exposure control for adjusting the X-ray examination apparatus on the basis of the measurement signal.

2. Description of Related Art

An X-ray examination apparatus of this kind is known from German Offenlegungsschrift DE 44 06 677.

The known X-ray examination apparatus includes an X-ray detector with a conversion screen and an image sensor. The conversion screen derives an optical image from the X-ray image and the image sensor derives the image signal from the optical image. The image sensor of the known X-ray examination apparatus is provided with shift registers for reading out electrical charges from the image sensor. The shift registers, moreover, are sensitive to light of the optical image and convert a part of the light of the optical image into electrical charges which constitute the measurement component.

The shift registers are arranged at the edge of the image sensor. Consequently, it is a drawback of the known X-ray examination apparatus that the measurement component can be derived only from a part of the edge of the optical image. Because brightness values of the edge of the optical image usually are not representative of brightness values in the remainder of the optical image, the measurement signal is not very well suitable for accurate adjustment of the X-ray examination apparatus in order to form an image signal whereby details in the optical image can be suitably visualized.

SUMMARY OF THE INVENTION

It is an object of the invention to provide an X-ray examination apparatus which can be adjusted more accurately than the known apparatus.

This object is achieved by means of an X-ray examination apparatus according to the invention which is characterized in that the X-ray detector is arranged in such a manner that the measurement signal relates predominantly to relevant image information in the X-ray image.

The X-ray examination apparatus according to the invention is adjusted on the basis of relevant image information in the X-ray image. Consequently, the X-ray examination apparatus can be readily adjusted in such a manner that relevant image information is suitably visualized. The X-ray examination apparatus can be accurately adjusted notably because it is not necessary to take into account differences between brightness values relating to relevant image information and brightness values wherefrom the measurement signal is derived. Relevant image information concerns image information in a portion of the x-ray image that is required to be accurately reproduced. Such relevant information may be selected by the operator (e.g. the radiologist) in view of the part of the patient's body to be radiologically examined.

From the European patent application EP 0 629 105 it is known to adjust an X-ray examination apparatus on the basis of relevant image information, but the X-ray examination apparatus disclosed therein utilizes a separate auxiliary light detection system for deriving a measurement signal, using an own photodetector, in addition to a television camera for supplying the image signal. It is a further advantage of the X-ray examination apparatus according to the invention that the accurate adjustment can be achieved without utilizing such a complex and expensive auxiliary light detection system. The adjustment of the X-ray examination apparatus concerns, for example the adjustment of an X-ray source or the X-ray detector. The adjustment of the X-ray source concerns notably the energy and the intensity of the X-rays emitted by the X-ray source and the duration of the irradiation.

These and other aspects of the invention will be described in detail hereinafter on the basis of the embodiments as defined in the dependent Claims.

The X-ray detector is preferably provided with a conversion unit for deriving an optical image from the X-ray image. The image sensor is preferably provided with an image pick-up section for deriving electrical charges from the optical image. The image pick-up section is arranged to receive light from substantially the entire optical image. The image pick-up section notably receives light from a part of the optical image which contains relevant image information. The electrical charges in the image pick-up section represent brightness values in the optical image. For the measurement component a part is selected of the electrical charges which relate notably to relevant image information. It is thus achieved that the measurement signal relates to relevant image information in the optical image so that the X-ray examination apparatus can be accurately adjusted. In the case of such an adjustment it is achieved that signal levels of the image signal lie in a range such that the relevant image information can be clearly visualized by means of the image signal. The image signal is notably suitable for reproducing an image of high diagnostic quality, that is to say an image in which small details of low contrast, such as a small tumor in an early stage of pathology, are suitably visible.

Because brightness values of the optical image correspond to brightness values of the X-ray image, the optical image contains image information which corresponds to image information of the X-ray image.

The adjustment of the X-ray detector concerns, for example the adjustment of the image pick-up apparatus. The adjustment of the image pick-up apparatus concerns notably the control of a variable amplifier which is used to derive the image signal from electrical charges and the adjustment of a diaphragm for controlling the amount of light received by the image sensor from the optical image.

When the image sensor is adjusted on the basis of the mean brightness of the optical image, it is achieved that the image sensor is sensitive mainly to the range of brightness values occurring in the optical image. It is notably when the image sensor is a charged coupled (CCD) image sensor that the sensitivity of the CCD sensor can be adjusted by adjustment of the integration time on the basis of the measurement of the mean brightness of the optical image by the photosensor or on the basis of the substrate current. The measurement component is preferably available separately from the image component in order to derive the measurement signal therefrom. Consequently, first the measurement component can be read from the image memory, followed by the formation of the measurement signal which is subsequently used for accurate adjustment of the X-ray examination apparatus so that subsequently the X-ray image is formed and the image signal can be derived from the X-ray image. Using this accurate adjustment, the image component is formed and the image signal is derived therefrom. The measurement component is preferably much smaller than the image component, so that the formation of the measurement signal requires substantially less time than the formation of the image signal. Thus, a correspondingly small portion of the x-ray image is used to derive the measurement signal that is employed to adjust the x-ray examination apparatus. Consequently, accurate adjustment of the X-ray examination apparatus requires a short time only, so that image signals can be derived from successive X-ray images in rapid succession and image information contained in a rapid succession of X-ray images can be suitably visualized.

For example, the image sensor is provided with an image memory for the storage of electrical charges from the image pick-up component. In such an image sensor the electrical charges are read out from the image pick-up component by way of transfer to the image memory. Subsequently, the measurement signal is derived from the electrical charge of the measurement component in the image memory.

It has been found that the transport of the electrical charges of the measurement component to the substrate of the image sensor is far less time-consuming than the reading out of the measurement component as the measurement signal via the image memory. The transport of the electrical charges of the measurement component to the substrate produces an electrical substrate current which can be readily measured. The substrate current is suitable to derive the measurement signal therefrom, because the current intensity of the substrate current corresponds to the electrical charges of the measurement component. The current intensity of the substrate current notably represents the mean brightness of the light incident on the image sensor; variations of the substrate current correspond to variations of the mean brightness of the light incident on the image sensor. When use is made of an image sensor which includes an image memory, the electrical charge of the measurement component can be transported from the image memory to the substrate and the measurement signal can be derived from the substrate current thus generated. The substrate current can be readily measured simultaneously with the reading out of the image signal. When light is incident on the image sensor, electron hole pairs are formed. One type of charge carrier, for example the electrons, is read out and the image signal is derived therefrom; the other type of charge carrier is transported to the substrate of the image sensor and forms the substrate current.

The X-ray image is formed on the X-ray detector for a given period of time so that the optical image is also available for this period of time. While the X-ray image is already being formed, it remains possible to readjust the X-ray examination apparatus so as to achieve accurate adjustment. When the storage of the optical image in the image memory is already started while the measurement signal is still being derived and the X-ray examination apparatus is still being readjusted, only little time will be required to adjust the X-ray examination apparatus and to derive the image signal from the X-ray image. It is notably possible to form an X-ray image with a suitable X-ray dose substantially without loss of time. Thus, the X-ray examination apparatus according to the invention is suitable for clearly visualizing image information of a rapid succession of X-ray images.

The image sensors are arranged, for example in such a manner that pixels of the optical image which are picked up by the photosensitive elements of one image sensor are situated in the intermediate spaces between the photosensitive elements of the other image sensor. Each of the image sensors picks up a respective sub-image and delivers an electronic sub-image signal to the combination unit which forms an electronic image signal for the composite image by means of the electronic sub-image signals. For example, the composite image is composed in such a manner that odd image lines have been picked up by means of one sensor and the even image lines by means of the other sensor. A different method of forming a composite image consists in selecting pixels picked up by the individual image sensors alternately as pixels of the composite image. The spatial resolution of the composite image is higher than that of the individual sub-images. The control signal is derived from the measurement signals in a manner resembling that used to derive the electronic image signal from the sub-image signals. Consequently, the control signal represents smaller details than the individual measurement signals. Using such a control signal, the X-ray examination apparatus can be adjusted on the basis of small details in the X-ray image. The X-ray examination apparatus according to the invention can be quickly and accurately adjusted so that it can reproduce very small details so as to be clearly visible.

The signal-to-noise ratio of the control signal is enhanced by addition of the measurement signals.

BRIEF DESCRIPTION OF THE DRAWING

These and other aspects of the invention will become apparent from and be elucidated with reference to the embodiments described hereinafter and the accompanying drawing; therein.

DETAILED DESCRIPTION OF THE PREFERRED EMBODIMENT

Figure 1:
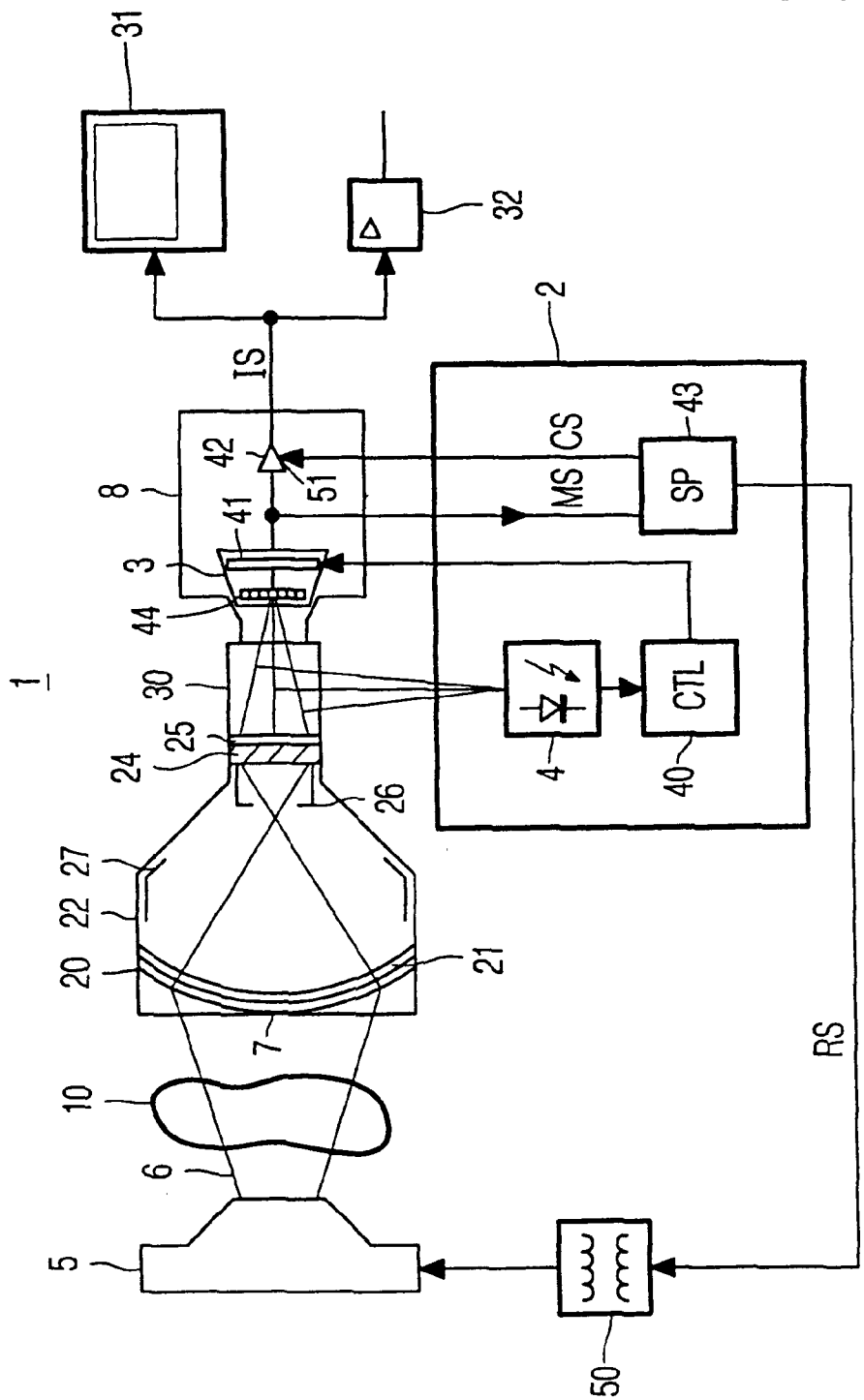
FIG. 1 is a diagrammatic representation of a first embodiment of an X-ray examination apparatus in which the invention is used.

FIG. 1 is a diagrammatic representation of a first embodiment of an X-ray examination apparatus in which the invention is used. The X-ray examination apparatus includes an X-ray source 5 for irradiating an object 10, for example a patient to be radiologically examined, by means of an X-ray beam 6. An X-ray image is formed on an X-ray-sensitive surface 7 of the X-ray detector 1 due to local differences in the X-ray absorption within the object 10. The X-ray detector of the embodiment shown consists of an image intensifier pick-up chain with an X-ray image intensifier 22 and a television camera 8. The X-ray image intensifier acts as the conversion unit 22 which derives an optical image from the X-ray image. The X-ray intensifier includes an entrance screen 20 which is provided with a conversion layer 7 and a photocathode 21. The X-ray-sensitive surface 7 is formed by the X-ray-sensitive conversion layer. The conversion layer converts incident X-rays into radiation whereto the photocathode 21 is sensitive. For example, the conversion layer 7 is a CsI:Na layer which converts X-rays into ultraviolet radiation. The photocathode 21 emits an electron beam 22 which is conducted to a phosphor layer 24 on an exit window 25 by means of an electron optical system. The electron optical system includes the photocathode 21, a hollow anode 26 and alignment electrodes 27. The television camera 8 derives the image signal from the optical image which is generated on the exit window 25 by the incident electron beam. The image signal IS is, for example an electronic video signal having signal levels which correspond to brightness values of the optical image and hence represent brightness values of the X-ray image. The optical image is formed, for example by visible light or by ultraviolet light or infrared light. The light of the exit window 25 is focused onto the image sensor 3 of the television camera by means of an optical coupling 30. The image sensor is preferably a charged coupled (CCD) image sensor which comprises the image pick-up section 44 having a large number of, for example 1024×512 photoelectric elements. The optical coupling 30 is, for example a lens system or a fiber optical coupling. The image signal IS of the television camera is applied to a monitor 31 on which the image information of the X-ray image is displayed. Moreover, the image signal IS is applied to a buffer unit 32 for further processing.

The X-ray examination apparatus includes an exposure control 2 for adjustment of the X-ray examination apparatus. To this end, the exposure control 2 is connected to the image sensor 3. The exposure control includes a control unit 40 which controls the image sensor. During a short period of time after the start of irradiation of the patient by the X-ray source, light from the exit window is converted into electrical charges, referred to as measurement charges, by the photoelectric elements. A short period of less than one millisecond is required so as to generate the measurement charges. The control unit 40 controls an exit register 41 of the image sensor in order to read out the measurement charges and to derive the measurement signal therefrom. The X-ray examination apparatus is accurately adjusted on the basis of the measurement signal and, using this accurate adjustment, the image sensor integrates electrical charges from the optical image. Integration requires a period of time of from approximately 10 ms to 200 ms. The exact integration duration is dependent on the brightness of the X-ray image; the brighter the X-ray image, the shorter the integration time should be. The integrated electrical charges are read out from the image sensor by way of the output register 41 and the variable amplifier 42 derives the image signal IS therefrom. The measurement signal MS is applied to a signal processing unit 43 in order to derive the X-ray control signal RS and the camera control signal CS therefrom. The X-ray control signal RS is applied to a high-voltage power supply 50. The high-voltage power supply 50 is connected to the X-ray source and supplies the X-ray source with a high voltage. The X-ray control signal RS is used to control the high-voltage power supply so as to ensure that the X-ray source emits X-rays of the desired energy and intensity. The duration of the irradiation can also be controlled by means of the X-ray control signal RS.

The signal processing unit 43 also applies the camera control signal CS to a control input of the variable amplifier 42. The camera control signal CS is used to adjust the gain factor of the variable amplifier 42 in such a manner that the signal levels of the image signal IS, generated by the variable amplifier, lie within a convenient range. The image information in the X-ray image can thus be reproduced with a high diagnostic quality by means of the image signal IS.

The exposure control also includes a photosensor 4 for measuring the mean brightness in a substantial part of the optical image. To this end, the optical coupling is arranged to guide a part of the light from the exit window to the photosensor. For example, the optical coupling includes a splitting prism for reflecting a part of the light from the exit window to the photosensor. The photosensor 4 measures the mean brightness in the optical image, for example the mean brightness in a circle situated at the center of the optical image and having a diameter amounting to approximately ⅔ of the diameter of the optical image. The photosensor 4 supplies an electronic photosensor signal whose signal level represents the measured mean brightness. The photosensor signal is applied to the control unit 40 and the control unit controls the integration time of the image sensor 3 on the basis of the photosensor signal. It is thus achieved that the sensitivity of the image sensor 3 suitably corresponds to the brightness values in the optical image so that, using the image sensor, the measurement signal MS can be derived; on the basis thereof the X-ray examination apparatus is accurately adjusted. The photosensor signal itself also acts as a measurement signal for adjusting the image sensor. Instead of using a separate photosensor, the integration time of the image sensor can also be adjusted on the basis of the substrate current, because this current represents the mean brightness of the optical image.

Figure 2:
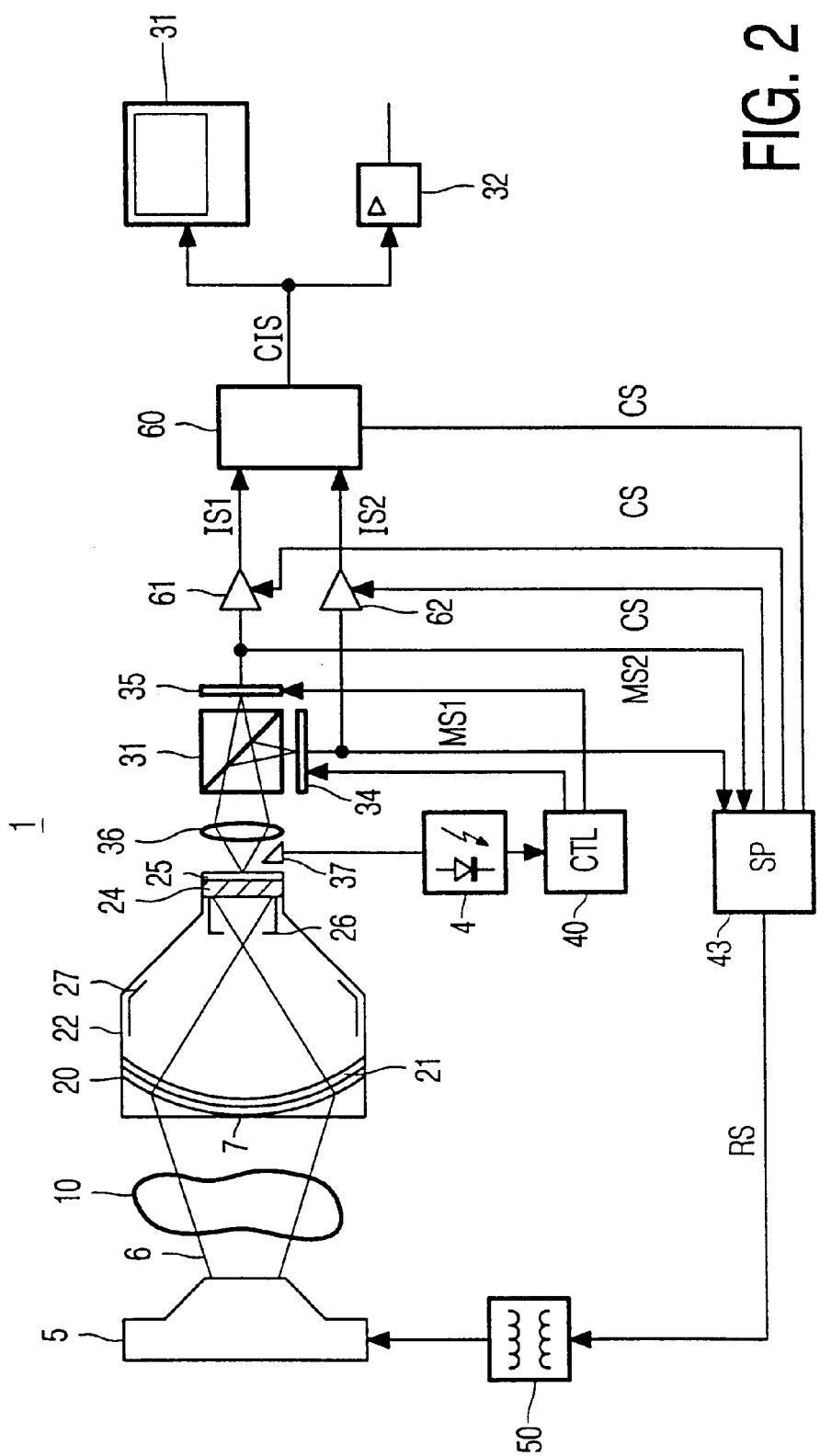
FIG. 2 is a diagrammatic representation of a second embodiment of an X-ray examination apparatus in which the invention is used.

FIG. 2 is a diagrammatic representation of a second embodiment of an X-ray examination apparatus in which the invention is used. The X-ray examination apparatus includes an image pick-up apparatus which is provided with a beam splitter 31 and two image sensors 34, 35. Using a lens 36 and the beam splitter 31, the light from the exit window 25 is focused onto the two image sensors 34, 35. The image sensors 34, 35 are positioned in such a manner that pixels of the optical image which are picked up by the photosensitive elements of one image sensor are situated in the intermediate spaces between the photosensitive elements of the other image sensor. Each of the image sensors 34, 35 applies a respective electronic sub-image signal to a combination unit 60. The combination unit 60 forms the electronic image signal for the composite image from the electronic sub-image signals. The spatial resolution of the composite image is significantly higher than that of the sub-images picked up by the individual image sensors. For example, use can be made of two CCD image sensors, each having 512×1024 photoelectric elements, so as to form an electronic image signal for a composite image with 1024×1024 pixels. The electronic sub-image signals are amplified by means of separate variable amplifiers 61, 62. A splitting prism 37 conducts a part of the light from the exit window to the photosensor 4 in order to measure the mean brightness of the optical image. The two image sensors apply a sub-measurement signal MS1, MS2 from a measurement component of the electrical charges to the signal processing unit 43; the signal processing unit 43 specifically adds the sub-measurement signals MS1, MS2 to one another so as to form the measurement signal. The signal processing unit derives the X-ray and camera control signal CS from the measurement signal. Using the X-ray control signal RS, the high-voltage power supply 50 is adjusted so as to ensure that the X-ray source 50 emits X-rays of the desired energy and intensity. The X-ray control signal RS can also be used to control the duration of the irradiation. The camera control signal CS is applied to the control inputs of the variable amplifiers 61, 62. Using the camera control signal CS, the gain factor of the variable amplifiers 61, 62 is adjusted in such a manner that the signal levels of the amplified sub-image signal generated by the variable amplifier lie within a suitable range. The camera control signal CS is also applied to the combination unit 60 in order to adjust the combination unit 60 in such a manner that the signal levels of the image signal CIS of the composite image lie in a range such that the image signal of the composite image is suitable to visualize the image information of the X-ray image with a high diagnostic quality.

All references cited herein are incorporated herein by reference in their entirety and for all purpose to the same extent as if each individual publication or patent or patent application was specifically and individually indicated to be incorporated by reference in its entirety for all purpose.

What is claimed is:

1. An X-ray examination apparatus, comprising: an X-ray detector for forming an X-ray image, wherein the x-ray detector further comprises a conversion unit for deriving an optical image from the X-ray image, and an image pick-up apparatus for deriving an image signal and a measurement signal from the optical image, wherein the image pick-up apparatus further comprises an image sensor comprising means to derive the image signal from the entire optical image, wherein the image sensor further comprises means to derive electrical charges from the optical image, means to derive the measurement signal from a measurement component of the electrical charges, means to derive the image signal from an image component of the electrical charges, and an image pick-up section for deriving the electrical charges of the measurement component and the electrical charges of the image component from the optical image, and an exposure control for adjusting the X-ray examination apparatus on the basis of the measurement signal in order to control the image sensor, wherein the measurement signal relates predominantly to relevant image information in a substantial part of the X-ray image, wherein the image pick-up apparatus further comprises a photosensor for measuring the mean brightness of the optical image, and means to adjust the image sensor on the basis of the mean brightness of the optical image.

2. An X-ray examination apparatus as claimed in claim 1 wherein the image pick-up apparatus further comprises means to measure a substrate current of the image sensor, and to derive the measurement signal from the substrate current.

3. An X-ray examination apparatus as claimed in claim 1 wherein the image pick-up apparatus further comprises means to adjust the image sensor on the basis of the substrate current.

4. An X-ray examination apparatus as claimed in claim 2 wherein the image sensor further comprises means to read out the measurement component and the image component separately from the image pick-up section.

5. An X-ray examination apparatus as claimed in claim 1 wherein the image sensor further comprises means to derive the measurement signal within a period of time in which the image pick-up section converts the optical image into an electrical charge.

6. An X-ray examination apparatus as claimed in claim 1 wherein the image pick-up apparatus further comprises a plurality of image sensors for converting light into electrical charges, wherein the image sensors further comprise means to deliver separate measurement signals which represent respective brightness values of the optical image, and wherein the exposure control further comprises means to derive a control signal for adjustment of the X-ray examination apparatus from the measurement signals.

7. An X-ray examination apparatus as claimed in claim 6 wherein the exposure control further comprises means to add the measurement signals from respective image sensors to one another so as to form the control signal.

8. The apparatus of claim 2 wherein the image sensor further comprises means to read out the measurement component and the image component separately from the image pick-up section.

9. The apparatus of claim 2 wherein the image sensor further comprises means to derive the measurement signal within a period of time in which the image pick-up section converts the optical image into an electrical charge.

10. The apparatus of claim 2 wherein the image pick-up apparatus further comprises a plurality of image sensors for converting light into electrical charges, wherein the image sensors further comprise means to deliver separate measurement signals which represent respective brightness values of the optical image, and wherein the exposure control further comprises means to derive a control signal for adjustment of the X-ray examination apparatus from the measurement signals.

11. The apparatus of claim 5 wherein the image pick-up apparatus further comprises a plurality of image sensors for converting light into electrical charges, wherein the image sensors further comprise means to deliver separate measurement signals which represent respective brightness values of the optical image, and wherein the exposure control further comprises means to derive a control signal for adjustment of the X-ray examination apparatus from the measurement signals.

12. The apparatus of claim 9 wherein the image pick-up apparatus further comprises a plurality of image sensors for converting light into electrical charges, wherein the image sensors further comprise means to deliver separate measurement signals which represent respective brightness values of the optical image, and wherein the exposure control further comprises means to derive a control signal for adjustment of the X-ray examination apparatus from the measurement signals.

13. The apparatus of claim 10 wherein the exposure control further comprises means to add the measurement signals from respective image sensors to one another so as to form the control signal.

14. The apparatus of claim 11 wherein the exposure control further comprises means to add the measurement signals from respective image sensors to one another so as to form the control signal.

15. The apparatus of claim 12 wherein the exposure control further comprises means to add the measurement signals from respective image sensors to one another so as to form the control signal.

* * * * *